(12) United States Patent
Okamura

(10) Patent No.: US 6,462,749 B1
(45) Date of Patent: *Oct. 8, 2002

(54) IMAGE PROCESSING UNIT, IMAGE PROCESSING METHOD, STORAGE MEDIUM SYNTHESIZING A SCENARIO INCLUDING AN OBJECT'S POSITION, SIZE AND DISPLAY TIME

(75) Inventor: Shuichi Okamura, Matsudo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,740

(22) Filed: Apr. 12, 1999

(30) Foreign Application Priority Data

Apr. 16, 1998 (JP) .......................... 10-121680

(51) Int. Cl.[7] .......................... G09G 5/00; G06T 17/00; G06F 17/00
(52) U.S. Cl. .......................... 345/619; 629/428; 463/35; 463/42
(58) Field of Search .......................... 345/433, 435, 345/619, 629, 581, 634, 641, 428; 463/35, 42

(56) References Cited

U.S. PATENT DOCUMENTS

| | | | | |
|---|---|---|---|---|
| 4,835,532 A | * | 5/1989 | Fant | 345/136 |
| 5,696,892 A | * | 12/1997 | Redmann et al. | 345/430 |
| 5,712,964 A | * | 1/1998 | Kamada et al. | 345/418 |
| 5,848,185 A | * | 12/1998 | Koga et al. | 382/173 |
| 5,898,430 A | * | 4/1999 | Matsuzawa et al. | 345/302 |
| 5,917,495 A | * | 6/1999 | Doi et al. | 345/419 |
| 5,990,901 A | * | 11/1999 | Lawton et al. | 345/581 |
| 6,072,479 A | * | 6/2000 | Ogawa | 345/326 |
| 6,084,590 A | * | 7/2000 | Robotham et al. | 345/419 |

* cited by examiner

*Primary Examiner*—Jeffery Brier
*Assistant Examiner*—Anthony J. Blackman
(74) *Attorney, Agent, or Firm*—Fitzpatrick, Cella, Harper & Scinto (57) ABSTRACT

By reconfiguring configuration information items according to the need, it was made possible to implement a natural displayed scene. Initialize the time "t" to "O", extract the attribute information item (position, size and display time information) of every (object) from the configuration information items sent from a communication network after getting through the step and detect the objects coincident in display time with the time "t". Then, acquire an inclusive relation (correlation) between individual (objects) from the position and size information of the detected nodes (objects), reconfigure the configuration information items on the basis of the inclusive relation, further advance the time "t" by a predetermined frame rate and thereafter return to the step to repeat the above processing.

21 Claims, 11 Drawing Sheets

IMAGE PROCESSING UNIT, IMAGE PROCESSING METHOD, STORAGE MEDIUM SYNTHESIZING A SCENARIO INCLUDING AN OBJECT'S POSITION, SIZE AND DISPLAY TIME

BACKGROUND OF THE INVENTION

1. Field of the Invention

The present invention relates to an image processing unit, an image processing method and storage medium, more specifically to an image processing unit and an image processing method for reconfiguring configuration information items of image data comprising a plurality of objects and storage medium in use for the same.

2. Related Background Art

With a level advancement in the coding technique of image data and a development in the computer technique for recent years, an image processing system for subjecting each object contained in image data to coding/decoding processing has been proposed. With this image processing system, coding of image data in the unit of an object makes it possible to code each object optionally, thus enabling the promotion of coding efficiency to be achieved.

Meanwhile, with such a type of image processing system, since image data are independently coded for each object, it is required at the time of decoding to synthesize these individual objects to prepare the scene (screen) corresponding to image data prior to the coding and there is a configuration information item for this purpose. And, in a former image processing unit, image data has been displayed on a display screen on the basis of the configuration information.

Figure 11:
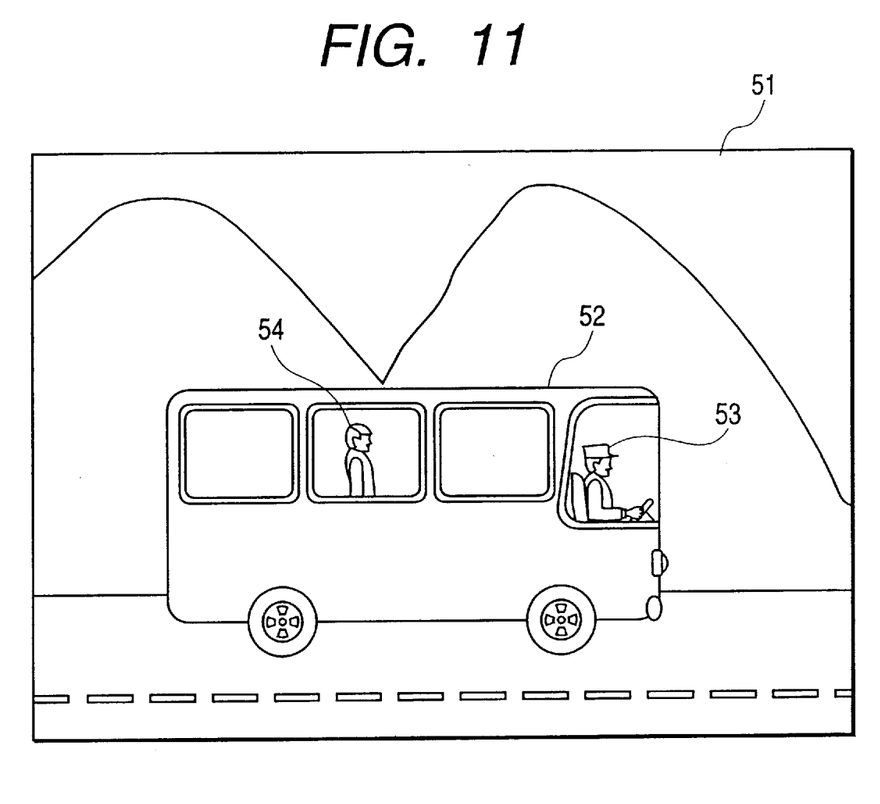
FIG. 11 is a display screen showing one example of scene decoded and synthesized formerly.

FIG. 11 is a drawing showing one example of scene displayed on the display screen of an image processing unit through coding/decoding processing, while the scene projects a look that a bus 52 runs in a background 51 composed of a road and a mountain and a driver 53 and a passenger 54 ride in the bus 52.

Figure 12:
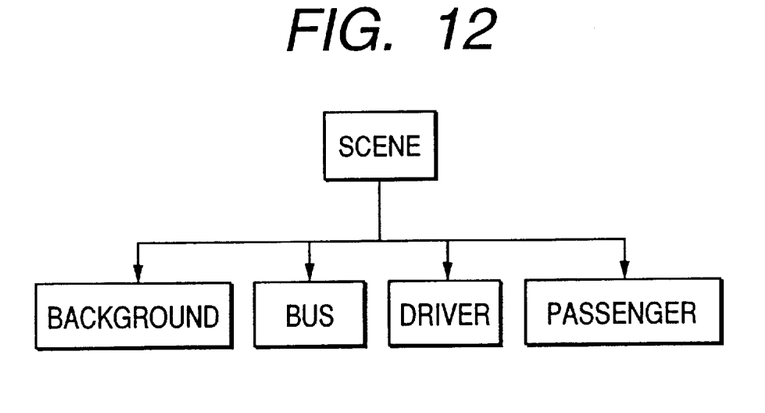
FIG. 12 is a tree diagram of the configuration information items of FIG. 11.

And, as shown in FIG. 12, the configuration information of this scene is described with tree-like node information items comprising a "background" node, a "bus" node, a "driver" and a "passenger" node. Generally, in addition to picture objects, each of these nodes includes voice objects and further attribute information items such as space coordinate information items represented by a position information item indicating the display position of an image or a size information item indicating the size of an image and a time information item indicating the display time of an image as well as relative space coordinate information items and relative time information items of each of "passenger" and "background" nodes respectively to the whole screen and on the time axis. By these attribute information items are determined when, where and what picture object is displayed.

Figure 13:
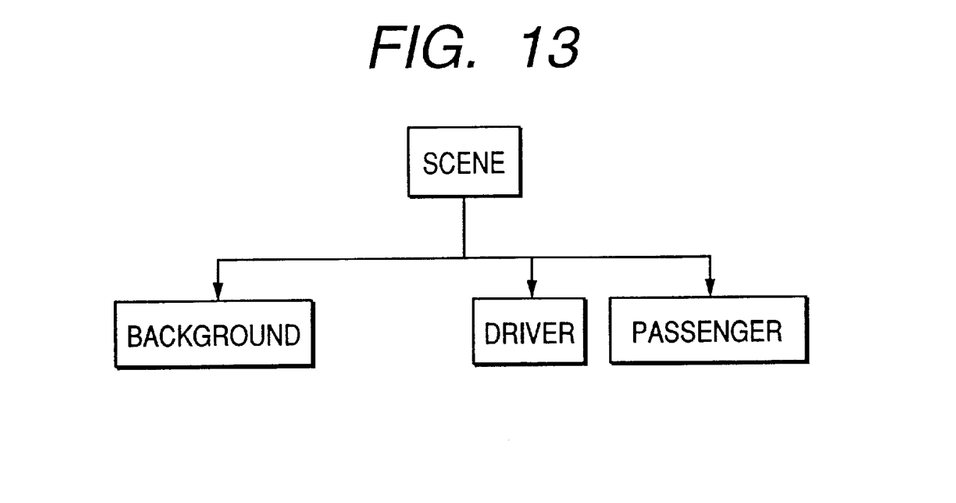
FIG. 13 is a tree diagram of the configuration information items with the specific objects deleted by a former method for processing image data.
Figure 14:
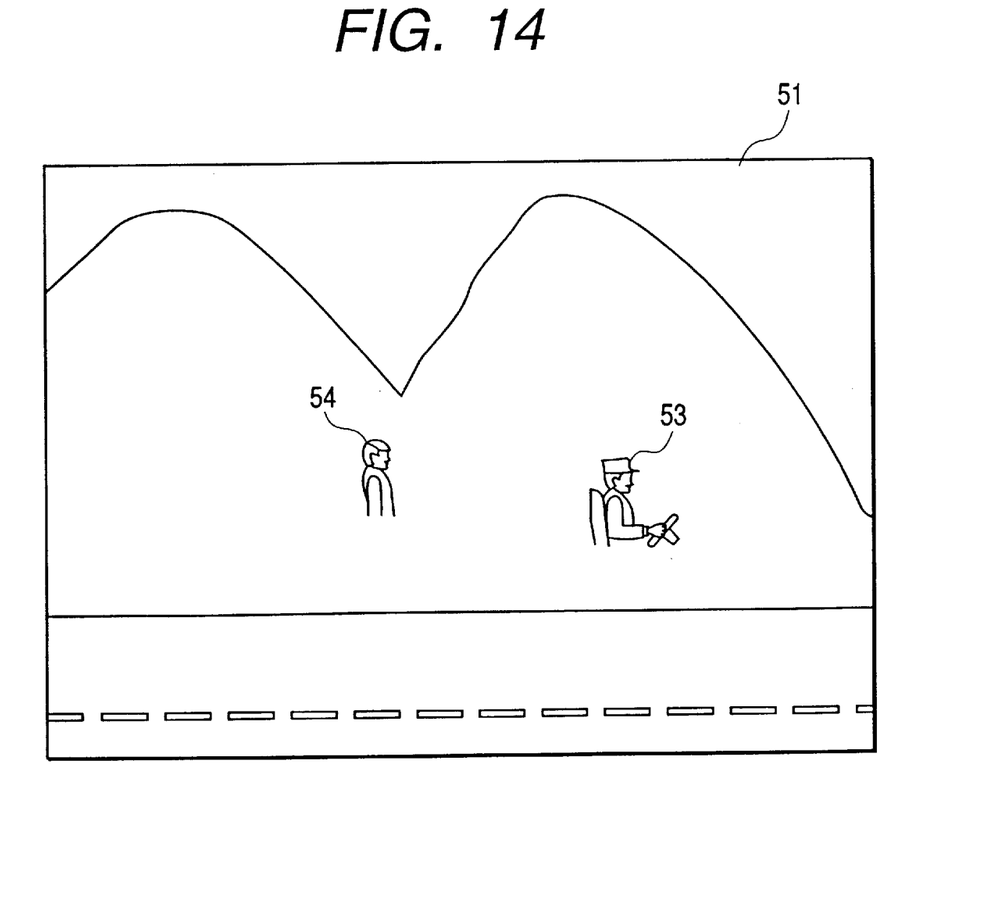
FIG. 14 is a display screen showing a scene with the specific objects deleted by a former method for processing image data.

Unless the configuration information items of a scene are made on the basis of the correlation functions between individual objects, however, the above image processing unit presented a problem that deletion of a "bus" node from the configuration information of FIG. 12 as shown in FIG. 13, results in display of an unnatural scene, because of leaving a driver 53 and a passenger 54 relating to the bus 52 undeleted as shown in FIG. 14.

Considering such a problem, the present invention has one purpose in presenting an image processing unit capable of creating a natural display screen by reconfiguring the configuration information items according to the need, and a method for processing image data.

SUMMARY OF THE INVENTION

One embodiment of the present invention provides an image processing unit comprising input means for inputting configuration information items of image data divided in the unit of an object and display means for synthesizing every object inputted from the input means to display image data on the display screen, featured by incorporating attribute information extracting means for extracting the attribute information item of each object on the basis of the above configuration information items, correlation acquiring means for acquiring the correlation between individual objects on the basis of the extracted result of the extracting means and configuration information modifying means for modifying the above configuration information items on the basis of the acquired results of the above correlation acquiring means.

DESCRIPTION OF THE PREFERRED EMBODIMENTS

Hereinafter, referring to the drawings, the embodiments of the present invention will be described in detail.

Figure 1:
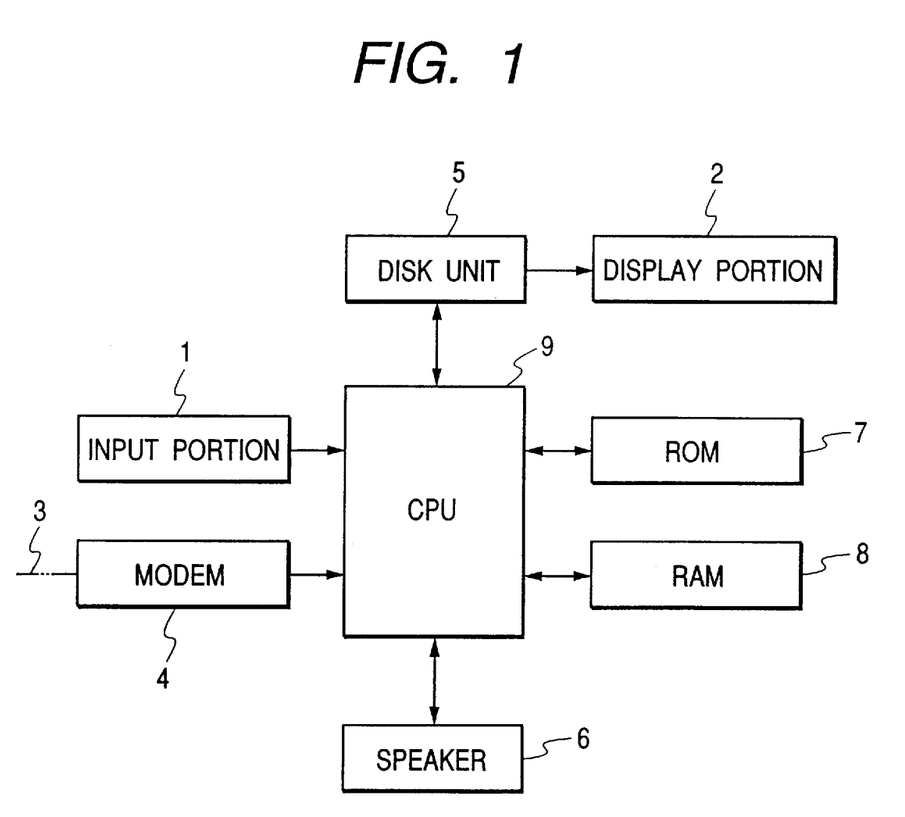
FIG. 1 is a block diagram showing one embodiment of image processing unit according to the present invention.

FIG. 1 is a block diagram showing one embodiment of image processing unit according to the present invention, which unit comprises an input section 1 made of a keyboard, a tablet capable of pen input or the like, a display section 2 such as LCD for synthesizing and displaying the image data coded in the unit of an object after the decoding, a modem 4 connected to a predetermined communication network 3 for receiving the coded data sent from the predetermined communication network 3, a disk drive 5 for hard disk, floppy disk or the like employed in storing input data to be inputted to the input section 1 or the modem 4 or taking out them when predetermined coded data are stored beforehand, a speaker 6 for outputting a voice signal, a ROM 7 for storing an image processing program or various data, to be described later a RAM 8 used for temporarily storing the operated result or as work area and a CPU 9 for performing a control of the whole unit.

Figure 2:
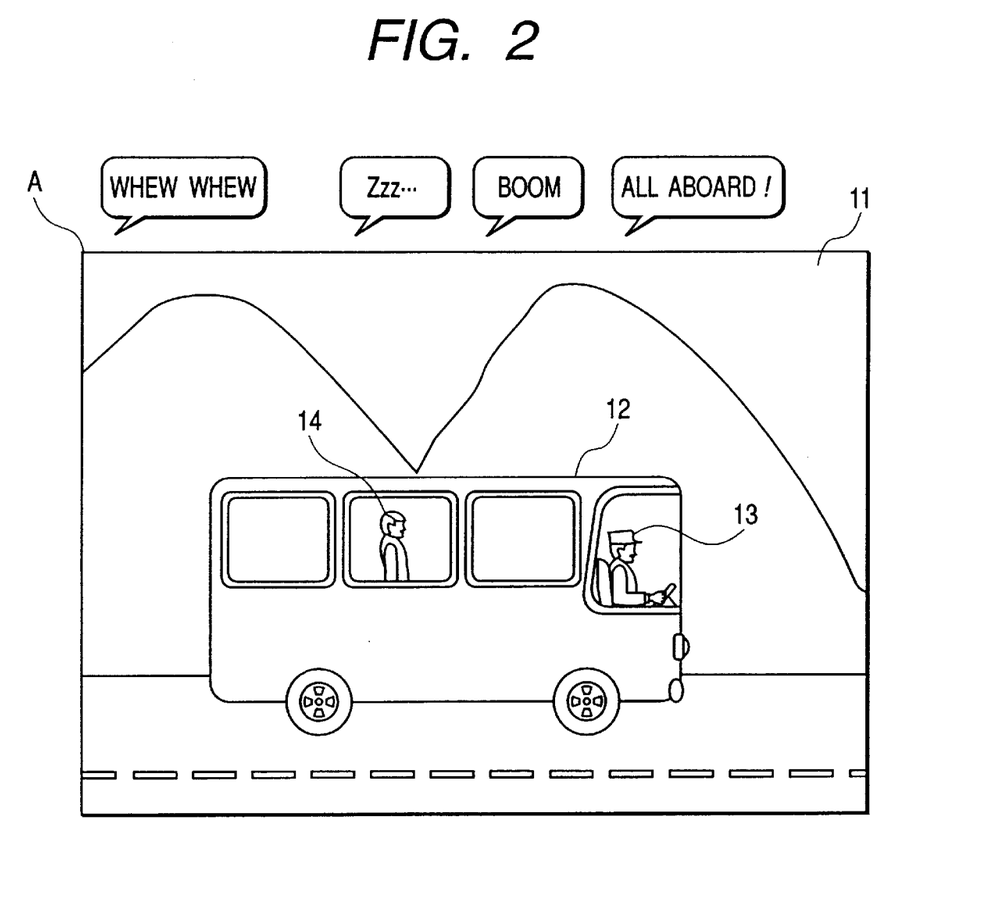
FIG. 2 is a drawing showing one example of scene synthesized from image data in the unit of an object by using this image processing unit.

FIG. 2 is a drawing showing one example of scene to be displayed on the display screen of the display section 2 of this image processing unit, in which a bus 12 is running against the background 11 comprising a road and a mountain and a driver 13 and a passenger 14 ride on the bus 12. Namely, in this embodiment, this scene has four picture objects comprising a "background", a "bus", a "driver" and a "passenger", further has four voice objects comprising the blowing noise of a wind, "whew whew", the breathing one of a sleeping passenger, "zzzz . . . ", the rotating one of an engine, "boom" and the voice of a driver, "All aboard!", respectively corresponding to these individual picture objects. In brief, this scene comprises 8 objects.

Figure 3:
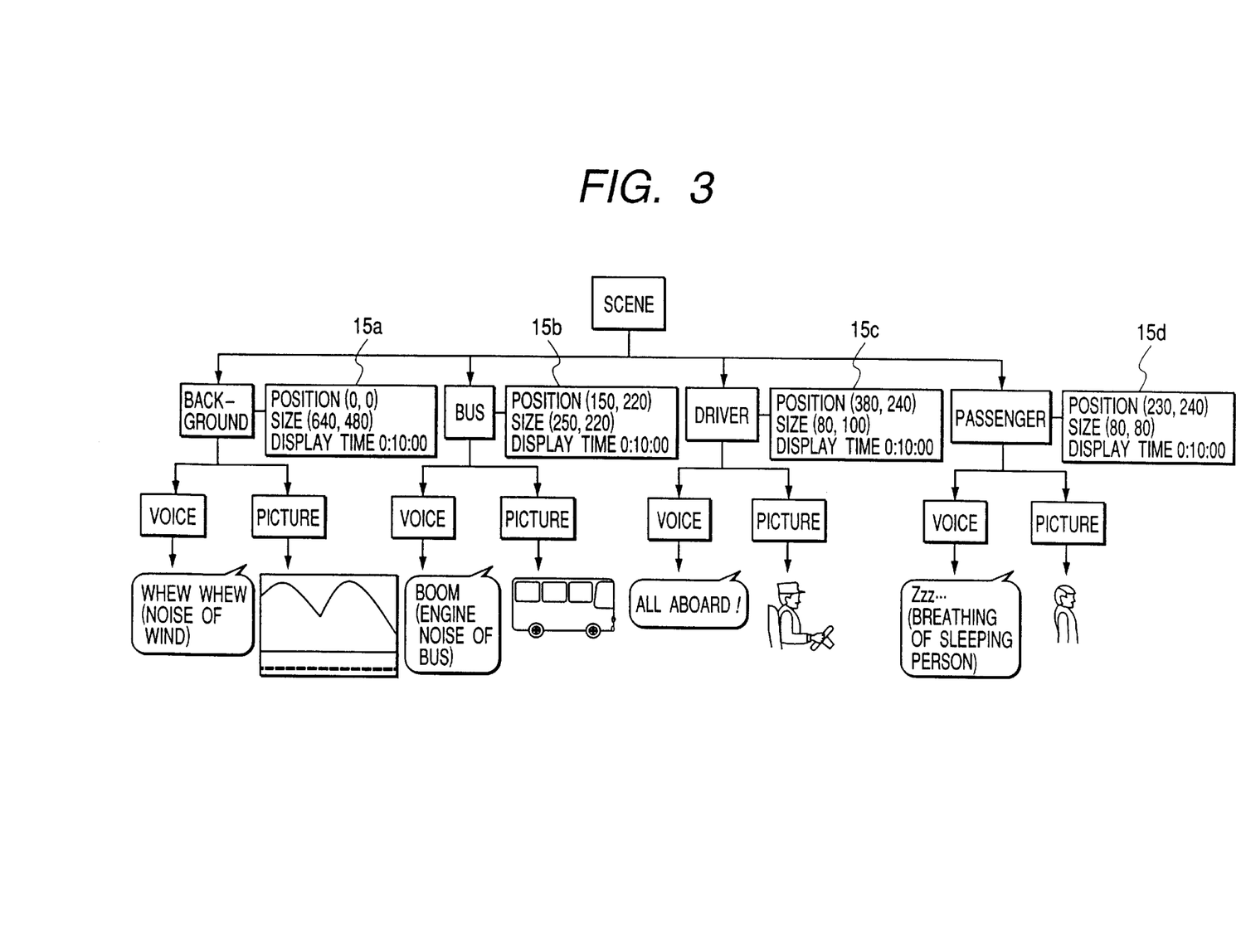
FIG. 3 is a tree diagram showing the configuration information items of the image data of FIG. 2.

FIG. 3 represents tree-like formed configuration information items, and the scene of FIG. 2 is synthesized referring the configuration information items.

Namely, this configuration information comprises a "background" node, a "bus" node, a "driver" node and a "passenger" node, which have respectively attribute information items 15a–15d comprising position information, size information and display time information. In this embodiment, the position information indicates the coordinate position of the top left point of each object by setting the top left point in the picture object of the background 11 to the origin A (0, 0). To be specific, with positive coordinate values taken from the origin A to the right (x-direction) and to the bottom (y-direction), the above individual nodes have their respective position information items as (x, y)=(0, 0), (150, 220), (380, 240) and (230, 240). In addition, a size information item comprises the width w and the height h of an object and the above individual nodes have their respective size information items, as (w, h)=(640, 480), (250, 220), (80, 100) and (80, 80). Furthermore, a display time information item is expressed as relative time information on the time axis relative to the background node. If all individual objects are displayed at the same time, every object is set to the same display time t (in this embodiment, 0:10:0).

And, in addition to picture objects, these individual nodes have their voice objects, while these picture and voice objects form tree-like configuration information items in pairs.

Figure 4:
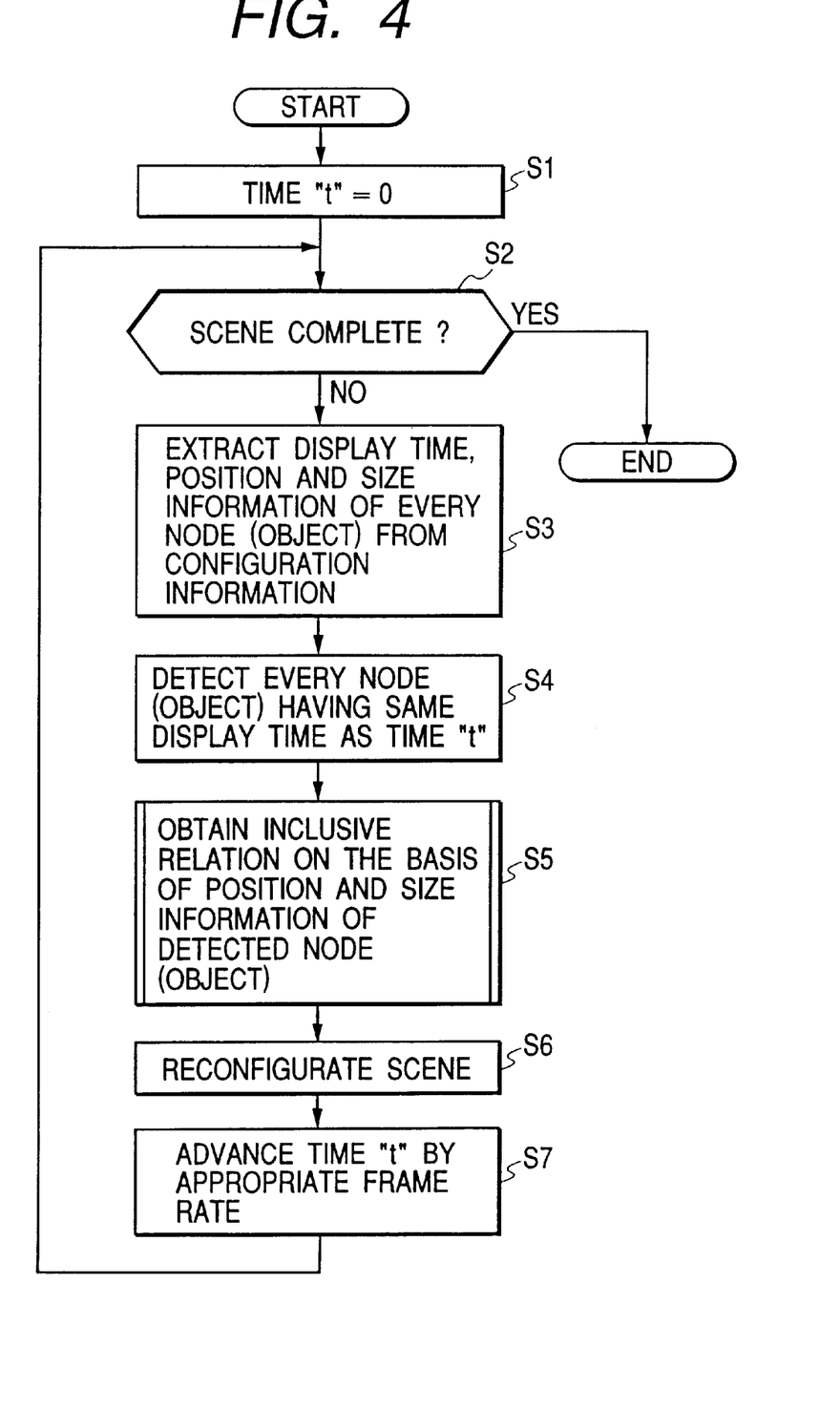
FIG. 4 is a flow chart showing the procedure for a processing method of image data according to the present invention (first embodiment)

FIG. 4 is a flow chart showing the procedure of a method for processing image data according to the present invention. The program is subjected to reconfiguration processing so as to obtain a scene with the background 11 alone left undeleted from the scene of FIG. 2. Incidentally, this program is executed by the CPU 9.

First, at the S1, the time "t" is initialized to "0", then at the step S2, it is discriminated whether the scene is completed or not. Since the answer of the step S2 is NO in the first loop, the program proceeds to the step S3 and extracts the attribute information items (position information, size information and display time information) of individual nodes (objects) from the configuration information of FIG. 3. And, the subsequent step S4, the CPU 9 detects every object having the same display time as the time "t". In other words, it extracts all objects present in the scene at the same display time as the time t (e.g., 0:10:00). In this embodiment, since the display time information items of all nodes are identical to the time t of the picture object of the background 11, the "bus" node, the "driver" node and the "passenger" node are detected.

Next, at the step S5, the CPU 9 finds an inclusive relation between the individual nodes (objects) from the position information and size information of the detected nodes (objects) and acquires the correlation.

Figure 5:
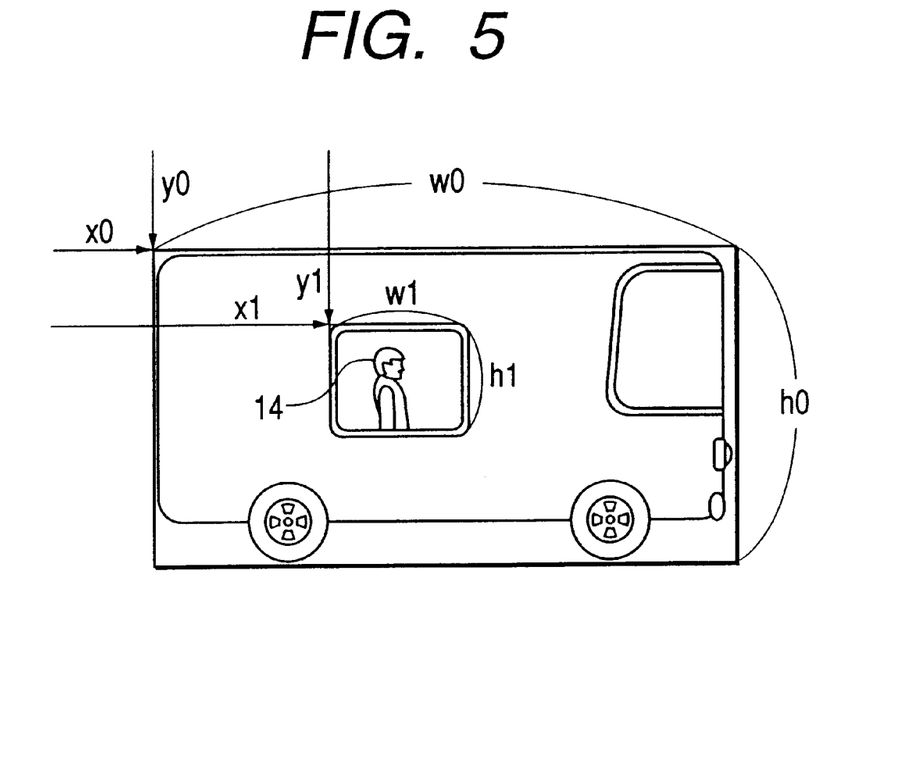
FIG. 5 is an illustration explaining a method for preparing an inclusive relation.

For example, concerning the inclusive relation between the picture object of the bus 12 and that of the passenger 14, if all of the Equations (1)–(4) hold true, the picture object of the passenger 14 is included in that of the bus 12 and both are judged to be inclusive.

$$x0 < x1 \tag{1}$$

$$x0 + w0 > x1 + w1 \tag{2}$$

$$y0 < y1 \tag{3}$$

$$y0 + h0 > y1 + h1 \tag{4}$$

Here, x0 and y0 denote the position information of the picture object of the bus 12 in the x-direction and the y-direction, x1 and y1 denote the position information of the picture object of the passenger 14 in the x-direction and the y-direction, w0 and h0 denote the width and the height of the picture object of the bus 12 and w1 and h1 denote the width and the height of the picture object of the passenger 14. Incidentally, in this embodiment, the maximum ranges of the passenger 14 to be projected, i.e., the width w1 and the height hi of the window frame, are taken as the width and the height of the picture object related to the passenger 14.

And, in this embodiment, since it is found from the configuration information of FIG. 3 that x0=150 and x1=230, the Equation (1) holds true and 400 (=x0+w0)>310 (=x1+w1) is obtained with values of w0 and w1 equal to 250 and 80, so that the Equation (2) holds true. In addition, since y0=220 and y1=240, the Equation (3) holds true and 440 (=y0+h0)>320 (=y1+h1) is obtained with values of h0 and h1 equal to 220 and 80, so that the Equation (4) holds true. Namely, all the Equations (1)–(4) hold true and the picture object of the passenger 14 is included in that of the bus 12, so that the inclusive relation (parent-child relationship) holds true between the bus 12 and the passenger 14.

Similarly, concerning the bus 12 and the driver 13, all the Equations (1)–(4) hold true, and the picture object of the driver 13 is included in that of the bus 12, so that the inclusive relation (parent-child relationship) holds true between the bus 12 and the driver 13.

Figure 6:
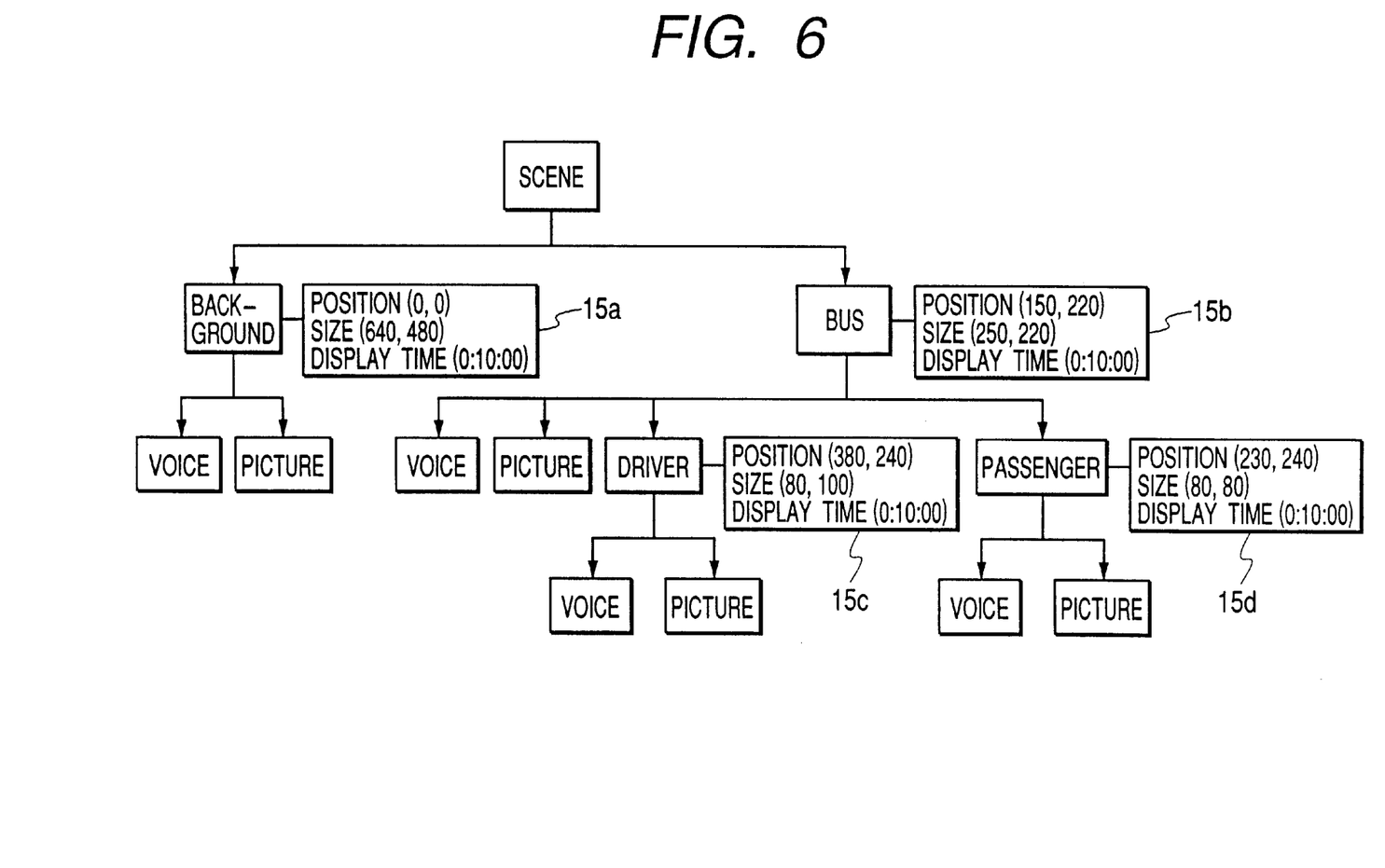
FIG. 6 is a tree diagram of configuration information items reconfigured by the first embodiment.

In this manner, the inclusive relation (parent-child relationship) holds true between the picture object of the bus 12 and the picture objects of the passenger 14 and the driver 13 and consequently the parent-child relationship is acquired between the three objects with the bus 12 regarded as the parent object and the passenger 14 and the driver 13 regarded as child objects of the bus 12 and the program proceeds to the step S6 to reconfigure a scene. Namely, among the configuration information items, the "bus" node becomes a parent node and the "driver" and "passenger" nodes become child nodes of the "bus" node to reconfigure a scene as shown in FIG. 6.

Next, the program proceeds to the step S7 to advance the time "t" by an appropriate frame rate. In the case of a frame reproducing rate equal to 30 frames/sec (30 scenes/ sec), for example, the program returns to the step S2 after the addition of 1/30 to the time "t" to repeat the above processing. And, when all scenes to be reproduced are completed, the answer of the step S2 turns to YES and the processing terminates.

Figure 7:
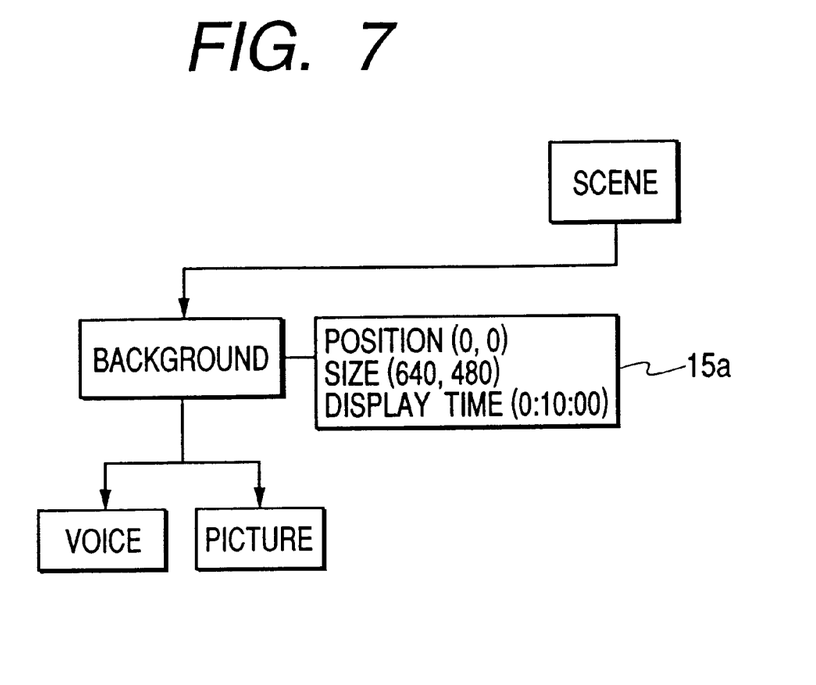
FIG. 7 is a tree diagram of the configuration information items with a "bus" node and the nodes related to the "bus" node deleted from the tree diagram of FIG. 6.

Like this, in this embodiment, the inclusive relation between the individual objects is computed to acquire the correlation between individual objects and reconfigure configuration information items on the basis of the correlation, so that in case of deleting the bus 12 from the scene of FIG. 2, for example, not only the "bus" node but also the "driver" and "passenger" nodes, child ones of the "bus" node, are deleted and the "background" node alone remains as shown in FIG. 7. Consequently, it follows that the background alone is projected in the scene, and therefore a former inconvenience (cf. FIG. 14) can be eliminated that the driver 13 or the passenger 14 remains undeleted when the bus 12 is deleted from a scene.

Incidentally, in the above first embodiment, the picture object of the whole screen is excluded from the making objects of inclusive relations like the picture object of the background 11, but configuration information items may be reconfigured with the background 11 regarded as the top parent object and all other objects included in the object of background 11.

Figure 8:
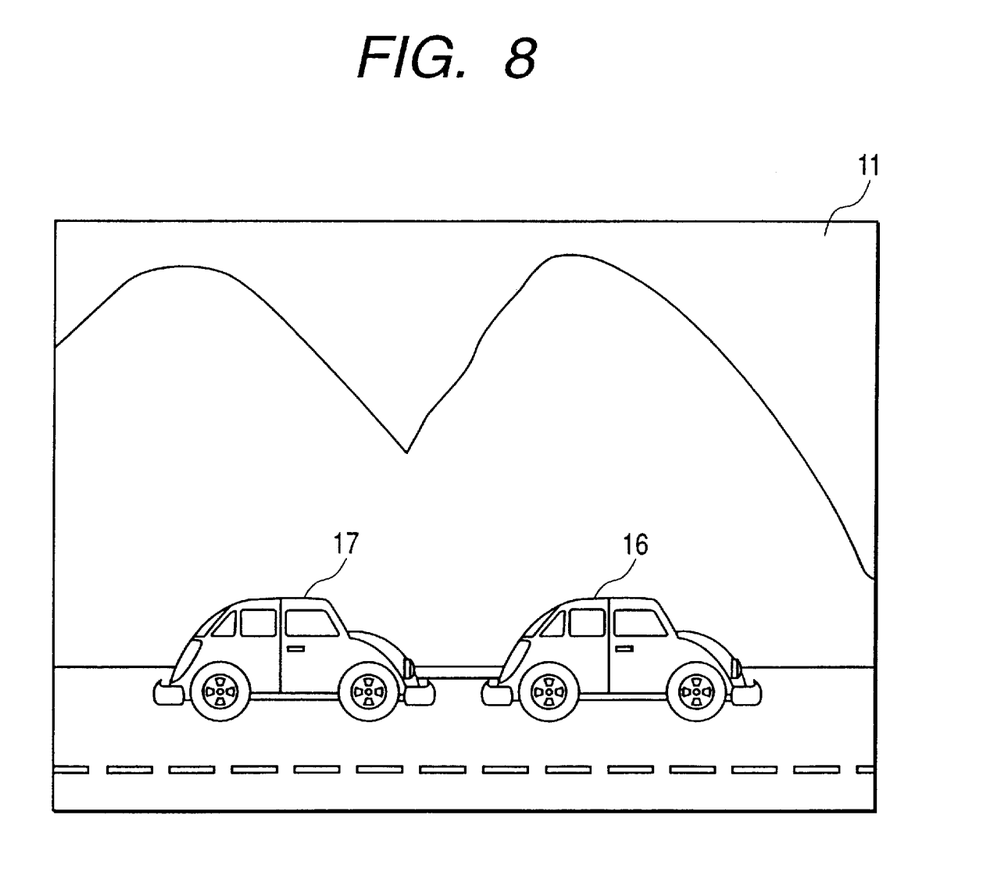
FIG. 8 is a display screen showing the status of a scene according to a second embodiment.
Figure 9:
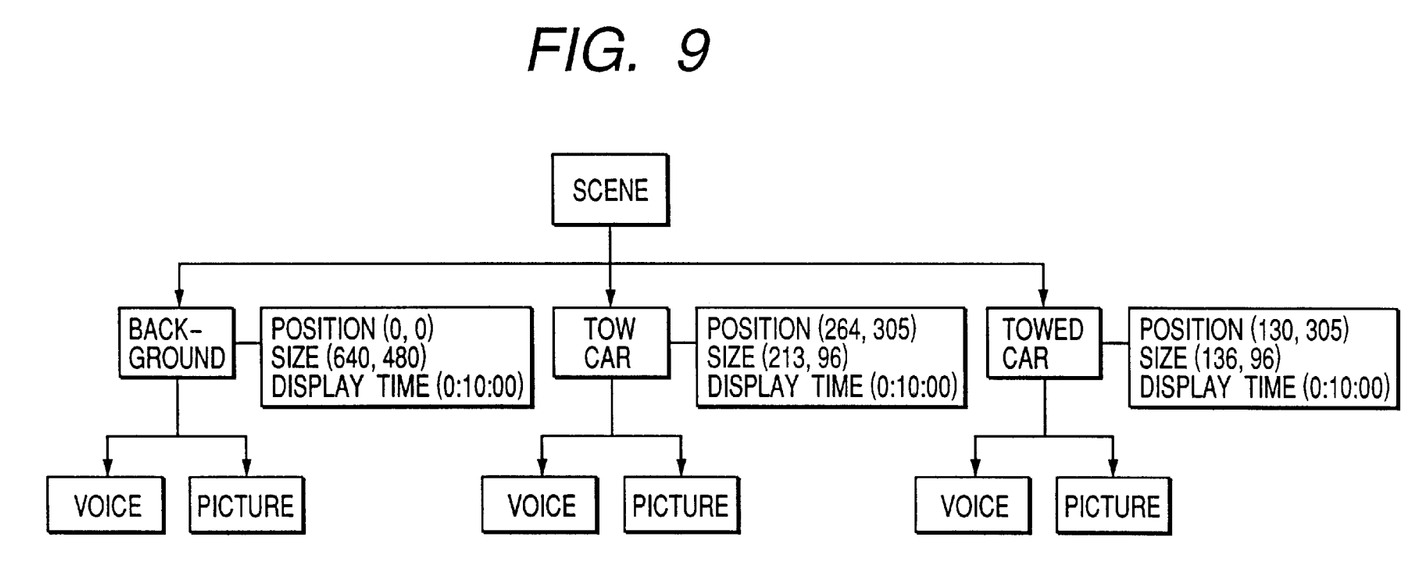
FIG. 9 is a tree diagram showing prior to the reconfiguration of configuration information items in the second embodiment.

FIG. 8 is a picture showing a scene on the display screen by a method for processing image data according to the second embodiment of the present invention, whereas FIG. 9 is a tree diagram showing the configuration information items prior to the reconfiguration.

Namely, in the second embodiment, a scene comprising three objects of a background 11 composed of mountains and a road, a tow car 16 and a towed car 17 to be towed by the two car 16 is projected on the display screen of the display section 2.

Figure 10:
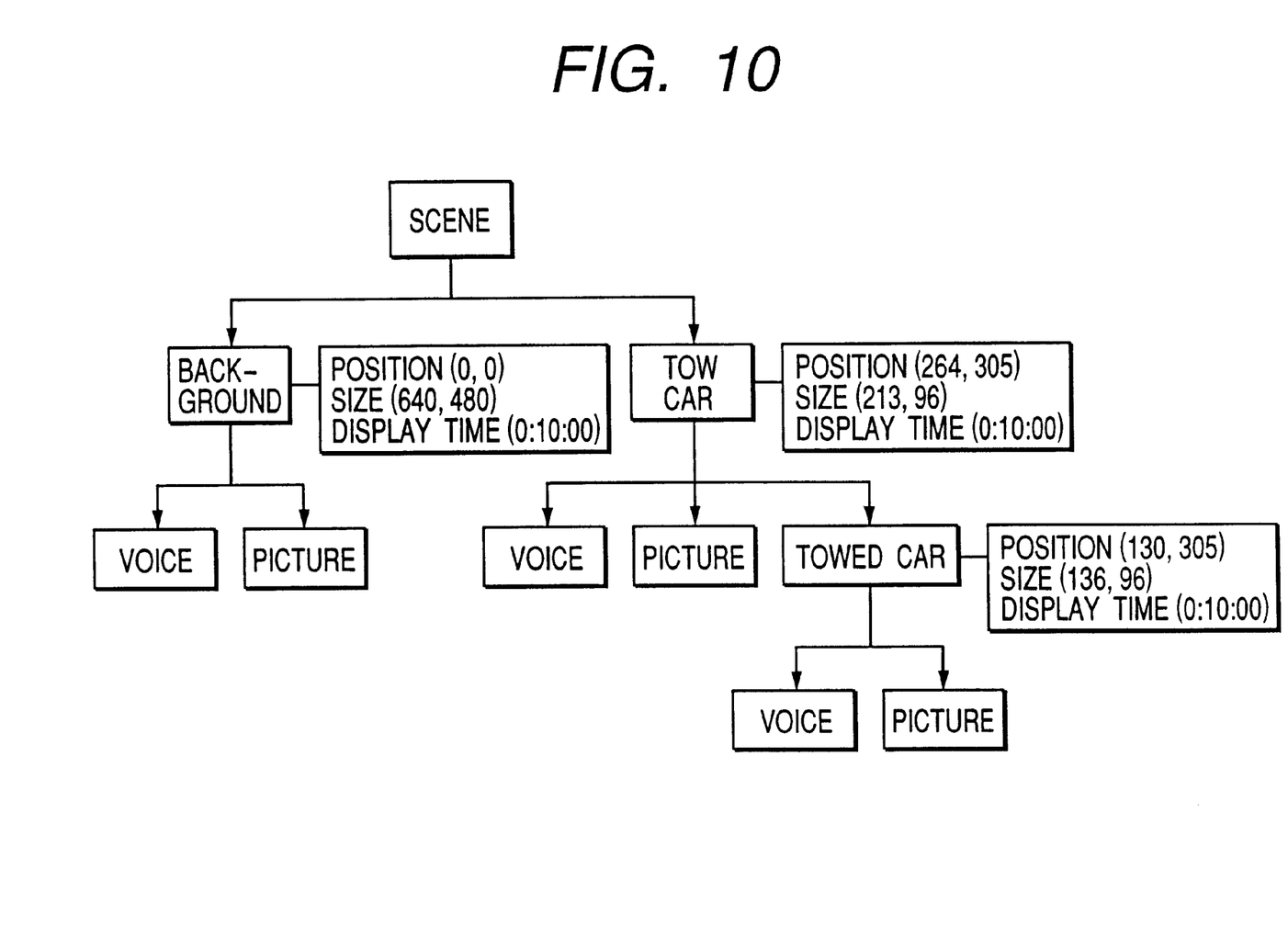
FIG. 10 is a tree diagram showing after the reconfiguration of configuration information items in the second embodiment.

And, with this embodiment, a deviation in position information between at a specific time and after a predetermined period is computed on the basis of the position information and display time information to obtain the moving amount and the moving direction within a predetermined period and there being a correlation between these objects is discriminated if the tow car 16 and the towed car 17 are coincident in the moving amount and the moving direction observed between a specific time and after a predetermined period. Namely, though the tow car 16 does not positionally include the towed car 17 in this case, the tow car 16 and the towed car 17 are discriminated to have a correlation because of coincidence both in moving amount and in moving direction and configuration information items are reconfigured as shown in FIG. 10. Thereby, the tow car 16 is deleted and at the same time the towed car 17 is also deleted, so that a natural scene can be projected on the display screen of the display section 2.

Incidentally, the present invention is not limited to the above two embodiments. Although an inclusive relation is obtained from the position information and the size information in the first embodiment, a combination of the first and second embodiments is also advisable. Namely, on the basis of the position information and the display time information, a deviation in position information between at a specific time and after a predetermined period may be computed to obtain the moving amount and the moving direction within a predetermined period and there being a correlation between the "bus" node and the "driver" and "passenger" nodes mutually inclusive may be discriminated if coincidence is found both in moving amount and in moving direction between at a specified time and after a predetermined period to reconfigure configuration information items.

Such a combination of the first and the second embodiments is suitable for the processing of image data, e.g. in a case where a signboard is installed in front of the bus 12 or in a case where a bird flies in a direction different from that of the bus 12 in front of the bus 12. Namely, in these cases, there positionally exists an inclusive relation with respect to the signboard and the bird in addition to the passenger and the driver both the driver 13 and the passengers 14 riding on the bus 12 have a correlation because of identity in moving amount and moving direction, but neither have any correlation with the bus 12 because of difference in moving amount and moving direction at each predetermined interval of display time in a case where a signboard is installed in front of the bus 12 or in a case where a bird flies in a direction different from that of the bus 12 in front of the bus 12. Thus, by acquiring a correlation only between the objects coincident both in moving amount and in moving direction, deletion of only the passenger 14 and the driver 13 is enabled with the signboard or a bird left undeleted on deleting the bus 12 from the scene, thus enabling a natural scene to be projected on the display screen.

Besides, similarly as in the second embodiment, if a parent-child relationship is formed between individual by referring only to a correlation in moving amount and moving direction, there is a fear that a streetcar happening to run in parallel to the bus 12 is discriminated to have a correlation with the bus 12. Thus, it is also advisable to discriminate at each predetermined interval of display time, for example, whether or not configuration information items should be reconfigured on acquiring a correlation from the inclusive relation based only on the position and size information between individual objects, whether or not configuration information items should be reconfigured on acquiring a correlation on the basis only of the moving amount and the moving direction between individual objects or whether or not configuration information items should be reconfigured on acquiring a correlation in consideration of all the above inclusive relations, the moving amount and the moving direction, so that the correlation can be acquired corresponding to the situation by selection.

Incidentally, the present invention is not limited to the above embodiments. With the above embodiments, coded data sent from a predetermined communication network 3 are received by a modem 4, but either in place of or in addition to a modem 4, a network card attaching section may be provided so as to receive coded data via the network card attached to the network card attaching section as an arrangement.

In the above embodiments, a case of retaining a program in a ROM was described, but the present invention is not limited to this and may be implemented using any store medium and in a circuit operating similarly as well.

Incidentally, the present invention may be applied to a system comprising a plurality of apparatuses or a unit comprising a single apparatus. Needless to say, the recording medium (storage medium) recording the program codes of a software for implementing the function of the above embodiments is supplied to a system or unit and the computer (or CPU or MPU) of the system or unit reads out and executes the program codes stored in the recording medium, thereby enabling the purpose of the present invention to be achieved also. In this case, the program codes themselves read out from the recording medium implement the function of the above embodiments and the recording medium recording the relevant program codes constitutes the present invention in the end.

As recording media for supplying program codes, for example, a floppy disk, hard disk, optical disk, optical magnetic disk, CD-ROM, CD-R, magnetic tape, nonvolatile memory card, ROM, or the like can be used.

Besides, on execution of program codes read out by a computer, the function of the above embodiments is not only implemented, but needless to say, the OS or the like working on the computer performs actual processing partially or wholly on the basis of an instruction of the program codes and the function of the above embodiments is implemented by this processing also in some cases.

Furthermore, needless to say, after the program codes read out from a recording medium are written into a function extension board inserted into a computer or a memory attached to a function extension unit connected to the computer, a CPU or the like installed on the function extension board or function extension unit performs actual processing partially or wholly on the basis of an instruction of the program codes and the function of the above embodiments is implemented by this processing in some cases.

As described above in detail, according to the present invention, configuration information items are reconfigured on the basis of a correlation between individual objects, so that even when a specific object is deleted at the time of decoding, the objects related to the specific object can be simultaneously deleted, thus enabling a natural scene to be easily created.

What is claimed is:

1. An image processing unit comprising input means for input configuration information items of image data divided in a unit of an object and display means for synthesizing every object inputted from the input means to display image data on the display means, further comprising:

attribute information extracting means for extracting an attribute information item of each object on a basis of said configuration information item, the attribute information item comprising position and size information items;

correlation acquiring means for acquiring a correlation between individual objects on a basis of an extracted result of said extracting means; and configuration information modifying means for modifying said configuration information items on a basis of acquired results of said correction acquiring means, wherein processing performed by said attribute information extracting means, said correlation acquiring means, and configuration information modifying means is performed at a predetermined period.

2. The image processing unit according to claim 1, further comprising inclusive relation computing means for computing an inclusive relation on the basis of the extracted result of said extracting means, wherein said correlation acquiring means acquires a correlation between the objects having said inclusive relation, wherein processing performed by said correlation acquiring means is performed at a predetermined period.

3. An image processing unit comprising:

input means for input configuration information items of image data divided in a unit of an object and display means for synthesizing every object inputted from the input means to display image data on the display means;

attribute information extracting means for extracting an attribute information item of each object on a basis of said configuration information item, the attribute information item comprising position and size information items;

correlation acquiring means for acquiring a correlation between individual objects on a basis of an extracted result of said extracting means;

configuration information modifying means for modifying said configuration information items on a basis of acquired results of said correction acquiring means; and moving amount/moving direction computing means for computing the moving amount and the moving direction of individual objects at each predetermined display time on the basis of said attribute information items, wherein said correlation acquiring means acquires a correlation between the objects coincident in said moving amount and in said moving direction.

4. An image processing unit comprising input means for inputting configuration information items of image data divided in a unit of an object and display means for synthesizing every object inputted from the input means to display image data on the display means, further comprising:

attribute information extracting means for extracting an attribute information item of each object on a basis of said configuration information items;

correlation acquiring means for acquiring a correlation between individual objects on a basis of an extracted result of said extracting means;

moving amount/moving direction computing means for computing a moving amount and a moving direction of individual objects at each predetermined display time on a basis of said attribute information item; and deciding means for deciding whether or not said configuration information items should be modified in consideration of a computed result of said moving amount/moving direction computing means, wherein said correlation acquiring means acquires a correlation between objects coincident in said moving amount and moving direction if a decided result of said deciding means is YES and acquires a correlation on a basis of only an extracted result of said extracting means if the decided result of said deciding means is NO.

5. The image processing unit according to claim 1 or claim 4, further comprising related object deleting means for deleting the related objects, related to a specific object, acquired by said correlation acquiring means together with said specific object in case of deleting said specific object from said all objects.

6. The image processing unit according to claim 1 or claim 4, wherein said attribute information item includes at least the position information of every object, the size information defining the size of every object and the display time information of every object.

7. The image processing unit according to claim 1 or claim 4, wherein image data, connected to a predetermined communication network, divided into each object are inputted via said predetermined communication network.

8. An image processing method of inputting configuration information items of image data divided in a unit of an object and synthesizing all input objects to display said image data on a display screen, comprising:

an attribute information extracting step of extracting an attribute information item of every object on a basis of said configuration information items, the attribute information item comprising position and size information items;

a correlation acquiring step of acquiring a correlation between individual objects on a basis of an extracted result of said extracting step; and a configuration information modifying step of modifying said configuration information on a basis of an acquired result of said correction acquiring step, wherein processing performed in said attribute information extracting step, said correlation acquiring step, and said configuration information modifying step is performed at a predetermined period.

9. The image processing method according to claim 8, wherein after computing an inclusive relation on the basis of the extracted result of said extracting step, said correlation acquiring step acquires a correlation between the objects having said inclusive relation, and wherein the acquiring performed in said correlation acquiring step is performed at a predetermined period.

10. An image processing method comprising:

of inputting configuration information items of image data divided in a unit of an object and synthesizing all input objects to display said image data on a display screen, comprising:

an attribute information extracting step of extracting an attribute information item of every object on a basis of said configuration information items, the attribute information item comprising position and size information items;

a correlation acquiring step of acquiring a correlation between individual objects on a basis of an extracted result of said extracting step; and a configuration information modifying step of modifying said configuration information on a basis of an acquired result of said correction acquiring step; and a moving amount/moving direction computing step for computing the moving amount and the moving direction of individual objects at each predetermined display time on the basis of said attribute information items, wherein said correlation acquiring step acquires a correlation between the objects coincident in said moving amount and in said moving direction.

11. An image processing method of inputting configuration information items of image data divided in a unit of an object and synthesizing all input objects to display said image data on a display screen, comprising:

an attribute information extracting step of extracting an attribute information item of every object on a basis of said configuration information items;

a correlation acquiring step of acquiring a correlation between individual objects on a basis of an extracted result of said extracting step;

a moving amount/moving direction computing step of computing a moving amount and a moving direction of individual objects at each predetermined display time on a basis of said attribute information item; and a deciding step of deciding whether or not said configuration information items should be modified in consideration of a computed result of said moving amount/ moving direction computing step, wherein said correlation acquiring step acquires a correlation between objects coincident in said moving amount and moving direction if a decided result of said deciding step is YES and acquires a correlation on a basis of only an extracted result of said extracting step if the decided result of said deciding step is NO.

12. The image processing method according to claim 8 or claim 11, wherein in case of deleting a specific object from said all objects, the related objects, related to said specific object, acquired by said correlation acquiring step are deleted together with said specific object.

13. The image processing unit according to claim 8 or claim 11, wherein said attribute information item includes at least the position information of every object, the size information defining the size of every object and the display time information of every object.

14. The image processing unit according to claim 8 or claim 11, wherein image data divided into each object are inputted from said predetermined communication network.

15. A storage medium having program codes for inputting configuration information items of image data divided in a unit of an object and synthesizing all input objects to display said image data on a display screen, comprising:

a program code of an attribute information extracting step of extracting an attribute information item of every object on a basis of said configuration information items, the attribute information item comprising position and size information items;

a program code of a correlation acquiring step of acquiring a correlation between individual objects on the a basis of an extracted result of said extracting step; and a program code of a configuration information modifying step of modifying said configuration information on a basis of an acquired result of said correlation acquiring step, wherein processing performed in said attribute information extracting step, said correlation acquiring step, and said configuration information modifying step is performed at a predetermined period.

16. The storage medium according to claim 15, wherein after computing an inclusive relation on the basis of the extracted result of said extracting step, said correlation acquiring step acquires a correlation between the objects having said inclusive relation, and wherein the acquiring performed in said correlation acquiring step is performed at a predetermined period.

17. An storage medium comprising program codes for inputting configuration information items of image data divided in a unit of an object and synthesizing all input objects to display said image data on a display screen, comprising:

a program code of an attribute information extracting step of extracting an attribute information item of every object on a basis of said configuration information items, the attribute information item comprising position and size information items;

a program code of a correlation acquiring step of acquiring a correlation between individual objects on the a basis of an extracted result of said extracting step; and a program code of a configuration information modifying step of modifying said configuration information on a basis of an acquired result of said correlation acquiring step; and a program code of a moving amount/ moving direction computing step for computing the moving amount and the moving direction of every object at each predetermined display time on the basis of said attribute information items, wherein said correlation acquiring step acquires a correlation between the objects coincident in said moving amount and in said moving direction.

18. A storage medium having program codes for inputting configuration information items of image data divided in a unit of an object and synthesizing all input objects to display said image data on a display screen, comprising:
- a program code of an attribute information extracting step of extracting an attribute information item of every object on a basis of said configuration information items;
- a program code of a correlation acquiring step of acquiring a correlation between individual objects on a basis of an extracted result of said extracting step;
- a program code of a moving amount/moving direction computing step of computing a moving amount and a moving direction of individual objects at each predetermined display time on a basis of said attribute information item; and
- a program code of a deciding step of deciding whether or not said configuration information items should be modified in consideration of a computed result of said moving amount/moving direction computing step, wherein said correlation acquiring step acquires a correlation between objects coincident in said moving amount and moving direction if a decided result of said deciding step is YES and acquires a correlation on a basis of only an extracted result of said extracting step if the decided result of said deciding step is NO.

19. The storage medium according to claim 15 or claim 18, further having a program code for deleting the related objects, related to a specific object, acquired by said correlation acquiring means together with said specific object in case of deleting said specific object from said all objects.

20. The storage medium according to claim 15 or claim 18, wherein said attribute information item includes at least the position information of every object, the size information defining the size of every object and the display time information of every object.

21. The storage medium unit according to claim 15 or claim 18, further having a program code for inputting image data divided into each object from said predetermined communication network.

* * * * *

UNITED STATES PATENT AND TRADEMARK OFFICE
CERTIFICATE OF CORRECTION

PATENT NO.    : 6,462,749 B1                                       Page 1 of 1
DATED         : October 8, 2002
INVENTOR(S)   : Shuichi Okamura It is certified that error appears in the above-identified patent and that said Letters Patent is hereby corrected as shown below:

Drawings,
Sheet 4, FIG. 4, "RECONFIGURATE" should read -- RECONFIGURE --.

Column 1,
Line 19, "for" should read -- in --.

Column 3,
Line 9, "taking" should read -- taking them --;
Line 10, "them" should be deleted;
Line 14, "performing" should read -- controlling --;
Line 15, "a control of" should be deleted; and
Line 30, "referring" should read -- referring to --.

Column 4,
Line 37, "hi" should read -- h1 --.

Column 5,
Line 19, "that" should read -- in which --; and
Line 37, "two" should read -- tow --.

Column 6,
Line 31, "to have" should read -- from having --.

Column 10,
Lines 24 and 53, "the a" should read -- a --; and
Line 41, "An" should read -- A --.

Signed and Sealed this

Eighth Day of July, 2003

JAMES E. ROGAN
*Director of the United States Patent and Trademark Office*